Dec. 4, 1934.  C. W. ANDERSON  1,983,062
MEDICAL ARTS STERILITY SLIDE RULE
Filed Dec. 9, 1933
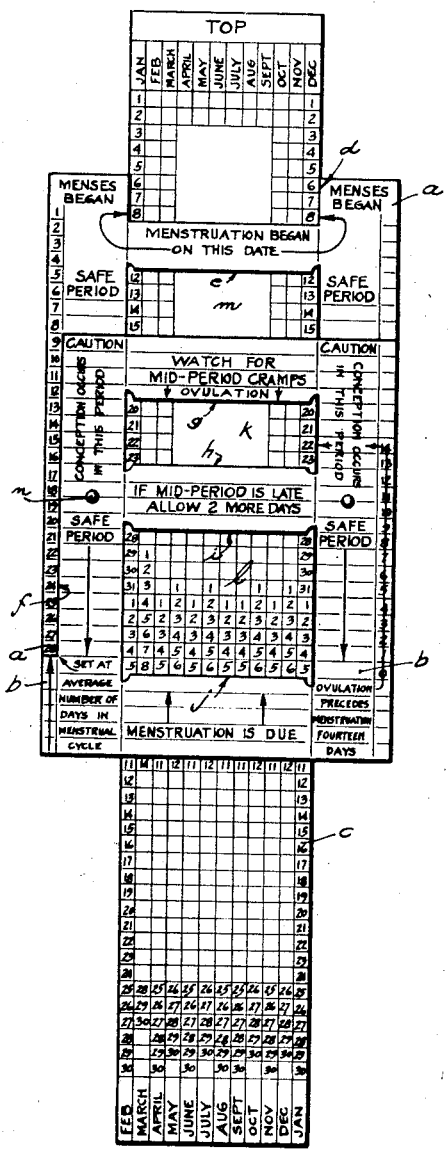
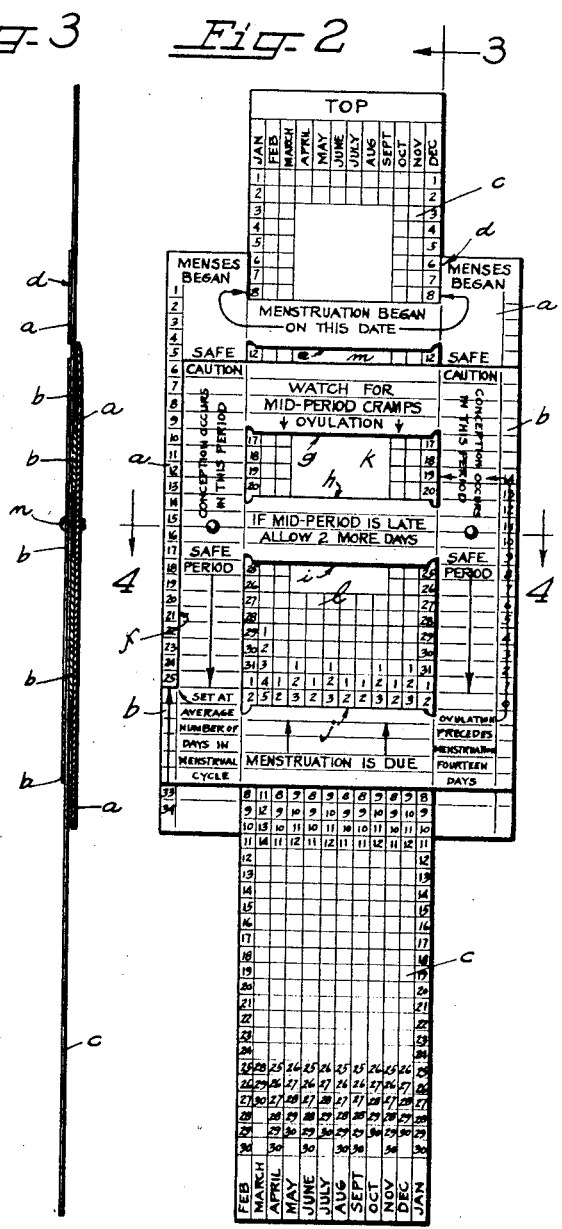
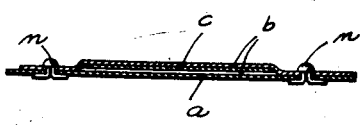
INVENTOR
Cyrus Walfred Anderson
BY
ATTORNEY Patented Dec. 4, 1934

1,983,062

UNITED STATES PATENT OFFICE 1,983,062

MEDICAL ARTS STERILITY SLIDE RULE

Cyrus Walfred Anderson, Denver, Colo.

Application December 9, 1933, Serial No. 701,619

4 Claims. (Cl. 40—109)

My present invention relates to a medical slide rule for indicating phases of the menstrual cycle of the human female and has as an object the provision of a rule which may be manufactured as a unit for physicians irrespective of the ultimate use for which it is intended and which may then be adjusted by the prescribing physician and set for his individual female patient according to certain facts peculiar to her. The medical rule of the present invention is, in some respects, an improvement on the rule embodied in my pending application filled on May 29, 1933, in the United States Patent Office as Serial Number 673,472 on Medical arts sterility slide rule.

In the slide rule of my former application, referred to, the physician in preparing the rule for his patient and as a part of the prescription for that individual female cuts certain slots in one of the parts of the rule in which another part slides and this cutting was done in accordance with the carrying out of the method under which the slide rule was used.

In the present invention provision is made for changing the relation of and making adjustments in parts of the rule so that all of the parts may be completely manufactured, including the necessary cutting, before the rule comes into the doctor's hands so that his work is lessened and he need only to assemble the parts and adjust them for the particular individual for whom he is prescribing. This gives more flexibility to the device and furthermore permits future readjustment according to the conditions of the case under consideration.

The invention contemplates the use for physiological purposes, of a medical slide rule of the character described which comprises a base member on which are printed or otherwise applied, consecutive numbers indicative of the number of days intervening between periodic menstruation in the human female, a body member having separate sections indicative of the menstrual phases of sterility, fertility and ovulation, and a slide member adapted for sliding engagement with both of the base and body members and having consecutive numbers indicative of the days and months of the year. The proper coordination of the base and body members sets the device so that it becomes adapted for the use of an individual female having a certain menstruation regularity and the proper coordination of the slide member with the other members gives the information on the dates of sterility, fertility and ovulation of that individual for a particular time desired.

Numerous other objects and advantages of the invention will be apparent as it is better understood from the following description, which, taken in connection with the accompanying drawing, discloses a preferred embodiment thereof.

Referring to the drawing:

Figure 1 is a front or face view of a medical slide rule embodying the present invention and showing the rule set for an average menstrual cycle of twenty eight days;

Fig. 2 is a similar view showing the rule adapted for an average menstrual cycle of twenty five days;

Fig. 3 is a longitudinal sectional view taken along the line 3—3 in Fig. 2; and

Fig. 4 is a transverse sectional view taken along the line 4—4 in Fig. 2.

The present embodiment of the invention as disclosed in the drawing comprises a slide rule composed of three pieces of cardboard or other suitable thin material, these pieces being a base member $a$, a body member $b$ and a slide member $c$. The base member $a$ beginning near its top (as viewed in Figs. 1 and 2) and extending nearly to its bottom end, is divided in thirty-four equal spaces and consecutive numerals from one to thirty-four are printed or otherwise stamped in a vertical line along its left hand margin. These numbers represent days and as used in the rule the numbers 25 to 34 inclusive provide individual setting positions, as will be hereinafter fully explained, by means of which the rule is made adjustable so that the physician can prescribe for female patients having individual average menstrual cycles of 25 days (the period recommended as the shortest time for which the rule may be successfully used) to 34 days, the longest time.

The base member $a$ is centrally notched or cut out along its top edge at $d$ the lower line of the notch being horizontally placed below the 1 space. Arrows and the legend "menstruation began on this date," adapt this first space as a point of reference for the slide member $c$ as will soon be fully explained. A slit $e$ is also made in the base and is parallel to and directed beneath the horizontal line of the notch $d$, this slit also being beneath the number 4 in the left margin.

The body member $b$ is inscribed with certain legends as shown in the drawing and is lined horizontally as viewed in Figs. 1 and 2 to set off spaces equal to those on the base $a$. It is also notched at $f$ along its left hand margin, the notch extending from the top of the body down to substantially six spaces from the bottom and is also slit within its center section to provide for sliding engagement with the slide member c.

The slide member c is divided, both longitudinally and transversely as viewed in Figs. 1 and 2, into equal spaces or squares set off by horizontal and vertical lines, the line intervals being the same as those on the other two members. The vertical lines set off twelve spaces corresponding to the twelve months of the year and these months are designated at both the top and bottom of the slide.

Slide c is nearly twice as long as the base a and is as wide as the base notch d or its slot c in which it slides. The slits in the body b are also of the same width and permit easy sliding movement of the slide member therein. The horizontal lines on the slide provide consecutively for the days of two months and these day numbers are indicated along both the left and right hand margins of the slide as well as in certain other of the spaces as shown. The last day of one month in any vertical row is followed by the first day of the next month so if the month has thirty days, for example, the next figure below the 30 is 1. Thus it will be seen that the slide c is a date slide.

The parts are assembled by an inter-engagement of the date slide c with the base and body members wherein the slide extends through the slits or slots of the other two members. Parts of the base a and of the body b bend out and in when the rule pieces are brought together and this leaves the date slide straight as best shown in Figs. 3 and 4.

There are four slits or slots g, h, i, j in the body b, reading down from the top, and when the slide c is in inserted position it extends in front of the spaces between the slots g, h and between the slots i, j and back of the rest of the central part of the body. Two windows k and l are thus presented in the body through which the spaces and numbers on the slide can be read. The k window may be termed an "ovulation" window and the l window a "pre-menstrual period of sterility" window. This will be further explained.

In assembled position the body member b rests fully in front of the base a. The slide c is also in front of the base except in the space between the notch d and the slot c where it extends behind. The top edge of the body b cooperates with the base slot c to form a third window m in which the "post menstrual period of sterility" dates may be observed.

When the physician has become satisfied as to the average menstrual cycle of his patient (this is set forth in some detail in my pending application above mentioned) he moves the body b on the base a until the desired number in the margin of the base is exposed at the bottom of the body notch f. Fig. 1 illustrates such a setting for a period of 28 days whereas Fig. 2 indicates a 25 day period. The base and body members may then be pinned together to maintain this setting. Double pointed pins n may be used for this purpose, the drawing indicating two such headed pins pushed through the body from the front through the base and turned back or riveted as best shown in Fig. 4.

The slide rule is now ready for the individual female having that particular menstrual cycle and the slide c is then moved to bring the date of the beginning of her last menses to the point of reference indicated on the base a in the notch d.

Considering the example shown in Fig. 1 the female has a regular twenty eight day menses interval. Her last menses began, say on February 8th, so by observing the window m one reads that her post-menstrual period of sterility is from the 12th to the 15th of February and that following the 15th conception is possible, this being a fertile period. Observing window k the 20th to the 23rd both inclusive are the most probable times for ovulation. She may expect ovulation to occur on the 22nd if everything is entirely regular and if she has come to recognize the phenomenon of ovulation in her own life, she can recognize the exact time of its occurrence. If ovulation takes place on the 22nd it is only necessary to observe window l for the pre-menstrual period of sterility which will be from the 28th of February until the 8th of March which is the date for the beginning of the next menstruation.

Should ovulation be irregular, adjustment can be made in the slide by placing the actual time of ovulation opposite the arrow at the right of the window k and again reading the corrected dates in the window l. The date of the next menstruation in any event will occur fourteen days after the date of ovulation. Outside influences such as overwork or the like may delay the date of ovulation but the adjustment just indicated nevertheless compensates for any irregularity. The importance of a knowledge on the part of a female of her exact time of ovulation will thus be evident.

In the example shown in Fig. 2 by the settings for the menstrual cycle of 25 days the same procedure is used as before. The same date of beginning February 8th is used but the times of the different phases differ considerably. It will be observed that the window m displays only a single day, the 12th of February and ovulation, if regular will occur on the 19th of February.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A medical slide rule for determining periods of fertility, sterility, ovulation and menstruation of a human female, which comprises a base having a transverse slot and a point of reference, a body having a plurality of transverse slots arranged in definite spaced relation, said body being engaged with said base and having longitudinal movement relative to it to provide a setting for a desired average menstrual cycle for the individual for which the rule is intended, and a date slide having engagement in the slots of said base and said body and movable therein to position the slide relative to the said base point of reference so that the dates of fertility, sterility, ovulation and menstruation are indicated in the rule.

2. A medical slide rule for determining periods of fertility, sterility, ovulation and menstruation of a human female, which comprises a base having a transverse slot and a point of reference, a body having a plurality of transverse slots arranged in definite spaced relation, said body being engaged with said base and having longitudinal movement relative to it to provide a setting for a desired average menstrual cycle for the individual for which the rule is intended, and a date slide having engagement in the slots of said base and said body so that it extends in front of portions of said body between adjacent slots and through windows formed in said body at such places and movable therein to position the slide relative to the said base point of reference so that the dates of fertility, sterility, ovulation and menstruation on the said slide are exposed in the said windows of the rule.

3. A medical slide rule for determining periods of fertility, sterility, ovulation and menstruation of a human female, which comprises a base having a transverse slot and having a point of reference printed on its face, a body having cooperative engagement with said base and having spaced intervals set off by slots and also having a notch by means of which the body is set relative to the said base to correspond to a desired average menstrual cycle, and a date slide movably engaged with the said body and said base and slidable in the said slots of the same, said slide having printed areas corresponding to the days of the month by means of which the following dates of fertility, sterility, ovulation and menstruation are shown at the said spaced body intervals when the said slide member is set, relative to said base point of reference, at the date of beginning of the last menstruation.

4. A medical slide rule for determining periods of fertility, sterility, ovulation and menstruation of a human female, which comprises a base having a transverse slot and having a point of reference printed on its face, a body having cooperative engagement with said base and having spaced intervals set off by slots and also having a notch by means of which the body is set relative to the said base to correspond to a desired average menstrual cycle, means for locking the said base and said body members in their said set relation for the desired cycle, and a date slide movably engaged with the said body and said base and slidable in the said slots of the same, said slide having printed areas corresponding to the days of the month by means of which the following dates of fertility, sterility, ovulation and menstruation are shown at the said spaced body intervals when the said slide member is set, relative to said base point of reference, at the date of beginning of the last menstruation.

CYRUS WALFRED ANDERSON.